(12) United States Patent
Rao et al.

(10) Patent No.: US 10,656,465 B2
(45) Date of Patent: *May 19, 2020

(54) WIDE COLOR-GAMUT VEHICLE INFOTAINMENT DISPLAY SYSTEM WITH QUANTUM DOT ELEMENT

(71) Applicant: HARMAN INTERNATIONAL INDUSTRIES, INCORPORATED, Stamford, CT (US)

(72) Inventors: Rashmi Rao, West Bloomfield, MI (US); Elijah Auger, Fenton, MI (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/836,725

(22) Filed: Dec. 8, 2017

(65) Prior Publication Data

US 2018/0107070 A1    Apr. 19, 2018

Related U.S. Application Data

(63) Continuation-in-part of application No. 15/570,741, filed as application No. PCT/US2016/034867 on May 27, 2016.

(Continued)

(51) Int. Cl.
*G02F 1/1335* (2006.01)
*F21V 8/00* (2006.01)
(Continued)

(52) U.S. Cl.
CPC ....... *G02F 1/133617* (2013.01); *G02B 6/005* (2013.01); *G02B 6/0023* (2013.01);
(Continued)

(58) Field of Classification Search
CPC ............ G02F 1/133617; G02F 1/3556; G02F 2001/133614; G02F 2001/133624;
(Continued)

(56) References Cited

U.S. PATENT DOCUMENTS

| | | |
|---|---|---|
| 5,276,779 A | 1/1994 | Statt |
| 7,052,152 B2 | 5/2006 | Harbers |

(Continued)

FOREIGN PATENT DOCUMENTS

| | | |
|---|---|---|
| EP | 2711768 A1 | 3/2014 |
| EP | 3 304 186 A1 | 4/2018 |

(Continued)

OTHER PUBLICATIONS

Non-final Office Action for U.S. Appl. No. 15/570,741 dated Nov. 2, 2018.

(Continued)

*Primary Examiner* — Alan B Cariaso
(74) *Attorney, Agent, or Firm* — Artegis Law Group, LLP

(57) ABSTRACT

A display device includes a light source that includes a blue light-emitting diode (LED) configured to generate a blue output light; a nanocrystal material that is disposed between the light source and a liquid crystal module, and a light guide assembly. The nanocrystal material receives the blue output light, converts a first portion of the blue output light to a green light emission, converts a second portion of the blue output light to a red light emission, and transmits a remainder portion of the blue output light. The light guide assembly includes a planar light guide optically coupled to a light-receiving surface of the liquid crystal module and a curved light guide optically coupled to the planar light guide and configured to receive light from the light source and direct the light toward the planar light guide.

20 Claims, 13 Drawing Sheets

Related U.S. Application Data

(60) Provisional application No. 62/168,673, filed on May 29, 2015.

(51) Int. Cl.
  *G02F 1/355* (2006.01)
  *G02F 1/13357* (2006.01)

(52) U.S. Cl.
  CPC ......... *G02B 6/0028* (2013.01); *G02B 6/0043* (2013.01); *G02F 1/3556* (2013.01); *G02B 6/0073* (2013.01); *G02F 2001/133614* (2013.01); *G02F 2001/133624* (2013.01); *G02F 2202/36* (2013.01); *G02F 2203/02* (2013.01)

(58) Field of Classification Search
  CPC . G02F 2202/36; G02F 2203/02; G02B 6/002; G02B 6/0023; G02B 6/0043; G02B 6/005; G02B 6/0073; G02B 6/0028
  See application file for complete search history.

(56) References Cited

U.S. PATENT DOCUMENTS

| | | | |
|---|---|---|---|
| 8,294,168 B2 | 10/2012 | Park et al. | |
| 10,094,537 B2 | 10/2018 | Asadi et al. | |
| 2006/0002141 A1* | 1/2006 | Ouderkirk | G02B 6/0001 362/609 |
| 2007/0018558 A1 | 1/2007 | Chua et al. | |
| 2008/0246017 A1 | 10/2008 | Gillies et al. | |
| 2009/0201698 A1* | 8/2009 | Klick | G02B 6/0018 362/555 |
| 2011/0032450 A1 | 2/2011 | Shigeta | G02B 6/0018 349/61 |
| 2011/0273906 A1* | 11/2011 | Nichol | G02B 6/0076 362/607 |
| 2011/0303940 A1 | 12/2011 | Lee et al. | |
| 2012/0274882 A1 | 11/2012 | Jung et al. | |
| 2012/0287381 A1 | 11/2012 | Li et al. | |
| 2013/0114299 A1 | 5/2013 | Lee | |
| 2013/0235611 A1* | 9/2013 | Franklin | G09F 13/04 362/602 |
| 2013/0322111 A1* | 12/2013 | Nishitani | G02B 6/0028 362/603 |
| 2013/0335671 A1 | 12/2013 | Fleck et al. | |
| 2014/0009959 A1* | 1/2014 | Park | G02F 1/133615 362/559 |
| 2014/0016351 A1* | 1/2014 | Park | G02B 6/0066 362/611 |
| 2014/0125802 A1 | 5/2014 | Beckert | |
| 2014/0132890 A1 | 5/2014 | Zhang et al. | |
| 2014/0204295 A1 | 7/2014 | Weiss et al. | |
| 2015/0109814 A1* | 4/2015 | Chen | G02B 6/0073 362/606 |
| 2016/0313593 A1* | 10/2016 | Grip | G02F 1/13452 |
| 2016/0363814 A1 | 12/2016 | Liu et al. | |
| 2017/0047486 A1* | 2/2017 | Herrmann | G02B 6/0028 |
| 2017/0052404 A1 | 2/2017 | Kang et al. | |
| 2017/0054053 A1 | 2/2017 | Jeon et al. | |
| 2017/0219184 A1 | 8/2017 | Petluri et al. | |
| 2017/0219758 A1* | 8/2017 | Jang | G02B 6/0023 |
| 2017/0229429 A1 | 8/2017 | He et al. | |
| 2017/0235041 A1 | 8/2017 | Ninan et al. | |
| 2018/0101068 A1 | 4/2018 | Rao et al. | |
| 2018/0107070 A1 | 4/2018 | Rao et al. | |
| 2018/0292591 A1 | 10/2018 | Rao et al. | |

FOREIGN PATENT DOCUMENTS

| | | |
|---|---|---|
| KR | 10-2018-0013932 A | 2/2018 |
| WO | 2012111893 A1 | 8/2012 |
| WO | 2015045735 A1 | 4/2015 |
| WO | 2016/196387 A1 | 12/2016 |

OTHER PUBLICATIONS

Non-final Office Action for U.S. Appl. No. 15/836,752 dated Dec. 13, 2018.
Android ("Is it possible to turn an Android tablet on or off over a wired connection such as USB?", 2012). https://android.stackexchange.com/questions/29939/is-it-possible-to-turn-an-android-tablet-on-or-off-over-a-wired-connection-such.
International Search Report Application No. PCT/2016/034867, dated Oct. 13, 2016, 16 pages.
Final Office Action received for U.S. Appl. No. 15/570,741 dated May 9, 2019, 34 pages.
Final Office Action received for U.S. Appl. No. 15/836,752 dated Apr. 8, 2019, 26 pages.
International Preliminary Report on Patentability received for PCT Application Serial No. PCT/US2016/034867 dated Dec. 14, 2017, 11 pages.
Non-Final Office Action received for U.S. Appl. No. 15/570,741 dated Oct. 24, 2019, 47 pages.
Hong et al., "High-Efficiency Quantum dot Remote Phosphor Film", vol. 54, No. 15, May 20, 2015, pp. 4617-4622.
Luo et al., "Polarization-Preserving Light Guide Plate for a Linearly Polarized Backlight", Journal of Display Technology, vol. 10, No. 3, Mar. 2014, pp. 208-214.
Non-Final Office Action received for U.S. Appl. No. 15/836,752 dated Jul. 30, 2019, 21 pages.
Partial Search Report for EP application No. EP16730582.0 dated Oct. 16, 2019.
Advisory Action received in U.S. Appl. No. 15/836,752 dated Feb. 12, 2020, 3 pages.

* cited by examiner

WIDE COLOR-GAMUT VEHICLE INFOTAINMENT DISPLAY SYSTEM WITH QUANTUM DOT ELEMENT

CROSS-REFERENCE TO RELATED APPLICATIONS

This application is a continuation-in-part of the co-pending U.S. patent application titled, "WIDE COLOR-GAMUT VEHICLE INFOTAINMENT DISPLAY SYSTEM," filed on Oct. 30, 2017 and having application Ser. No. 15/570,741 which is a national stage application of the international application titled, "WIDE COLOR-GAMUT VEHICLE INFOTAINMENT DISPLAY SYSTEM," filed on May 27, 2016 and having Application No. PCT/US2016/034867, which claims the benefit of United States provisional application titled, "ENHANCED VEHICLE INFOTAINMENT DISPLAY SYSTEM," filed on May 29, 2015 and having Application No. 62/168,673. The subject matter of these related applications is hereby incorporated herein by reference.

BACKGROUND

Field of the Various Embodiments

The various embodiments relate generally to automotive design and, more specifically, to a wide color-gamut vehicle infotainment display system with quantum dot element.

Description of the Related Art

In-vehicle infotainment (IVI) systems, also referred to as in-car entertainment (ICE) systems, may include various types of hardware devices and/or software modules that are integrated with or added to vehicles to enhance the driver and/or passenger experience. IVI systems have become a common feature in modern automobiles and other forms of transportation and may provide audio or video entertainment, automotive navigation, driver assistance, video gaming capability, Internet connectivity, and the like to passengers and drivers.

IVI systems typically include a display screen, such as a liquid crystal display (LCD) screen. One well-known drawback of LCD-based display screens is that such display screens have a relatively limited color gamut, which is the specific range of colors reproducible by the screen within the visible spectrum. For example, LCD-based display screens may have a color gamut of 72-74% of the National Television System Committee (NTSC) standard color gamut, which itself only includes a portion of all colors identifiable by the human eye. Consequently, some colors cannot be accurately displayed. As a result, if such colors are outputted for rendering via such a display, the colors will appear washed out and/or will be inaccurately displayed, degrading the viewing experience for IVI system users.

Another drawback with many LCD-based display screens is that the backlighting elements of such displays are generally arranged along an edge of the display screen. As a result, these backlighting elements are necessarily disposed near the touch-sensitive surface of the display screen, causing the touch-sensitive surface to be undesirably warm.

Accordingly, what would be useful is a vehicle infotainment display having improved color properties and temperature characteristics.

SUMMARY

The various embodiments set forth a display device that includes a display device that comprises a light source that includes a blue light-emitting diode (LED) configured to generate a blue output light; a nanocrystal material that is disposed between the light source and a liquid crystal module, and a light guide assembly. The nanocrystal material is configured to receive the blue output light, convert a first portion of the blue output light to a green light emission, convert a second portion of the blue output light to a red light emission, and transmit a remainder portion of the blue output light. The liquid crystal module is configured to receive the green light emission, the red light emission, and the remainder portion of the blue output light and generate an image that includes a portion of the green light emission, a portion of the red light emission, and a portion of the remainder portion of the blue output light. The light guide assembly comprises a planar light guide optically coupled to a light-receiving surface of the liquid crystal module and configured to receive incident light traveling in a first direction, and direct the incident light in a second direction toward the light-receiving surface of the liquid crystal module, and a curved light guide optically coupled to the planar light guide and configured to receive light traveling in a third direction from the light source, and direct the light in the first direction toward the planar light guide.

At least one advantage of the disclosed embodiments is that a vehicle infotainment display device can output more vibrant colors than white-LED-based display devices. Further advantages are that, during operation, a touch-sensitive surface of the display device does not become uncomfortably warm, and components of the display device experience less thermal stress.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

DETAILED DESCRIPTION

Figure 1:
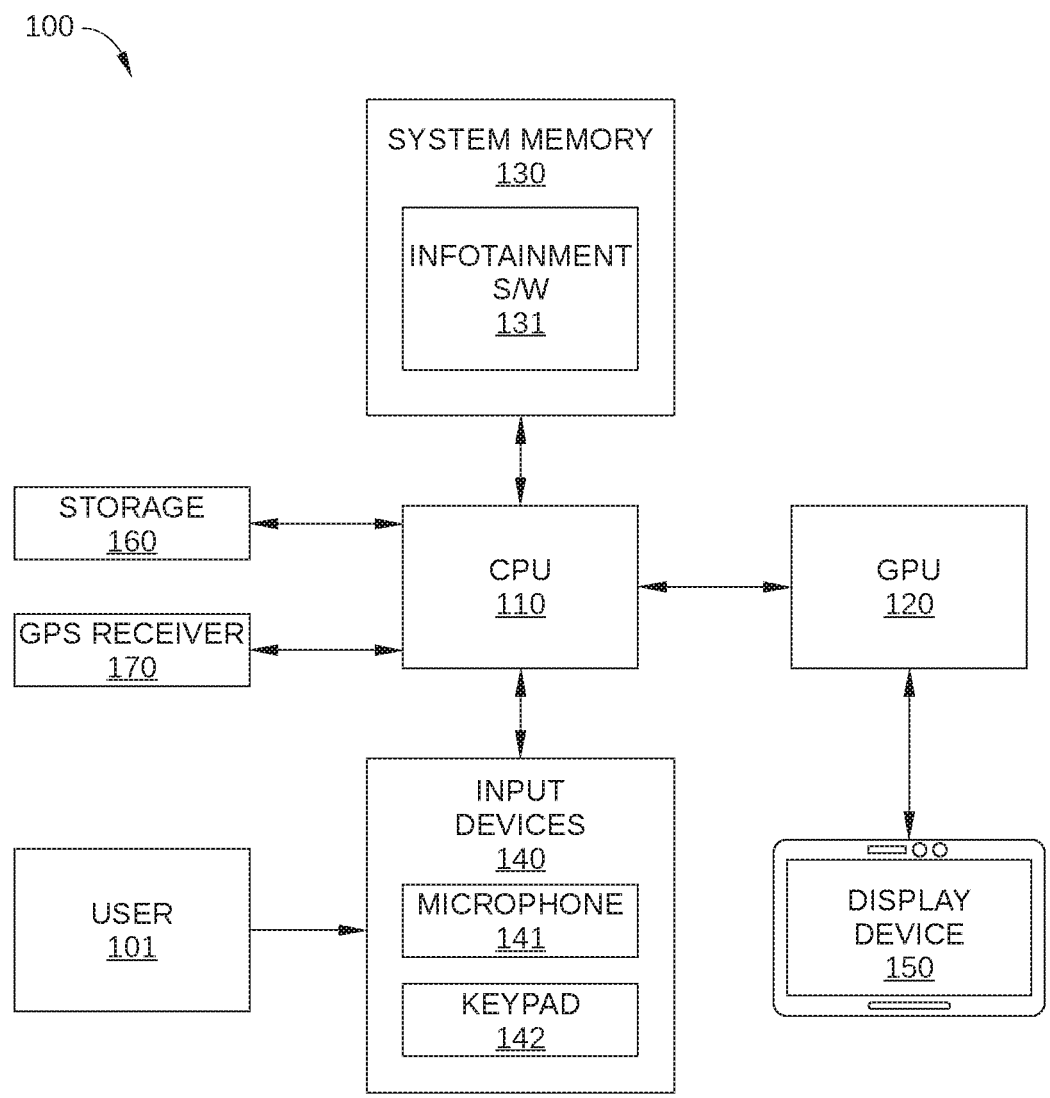
FIG. 1 is a block diagram illustrating a vehicular infotainment system configured to implement one or more aspects of the various embodiments.

FIG. 1 is a block diagram illustrating a vehicular infotainment system 100, configured according to various embodiments. Infotainment system 100 may be any technically feasible in-vehicle infotainment (IVI) system associated with a particular vehicle, and may include, without limitation, audio and/or video players, a video game console, one or more display devices, voice-recognition software, and the like.

In some embodiments, vehicular infotainment system 100 provides navigation information and other vehicle control information to a driver operating a vehicle. Specifically, for navigation, vehicular infotainment system 100 may be configured to accept input from a driver or other person (a "user" 101), including a destination location, to analyze road information, to calculate or determine one or more driving paths for the driver, to display such driving paths overlaid on a map, and to output associated driving instructions to the driver. Alternatively or additionally, vehicular infotainment system 100 may be configured to display controls to user 101 for controlling various equipment and devices within the vehicle. Such equipment and devices may include, without limitation, radio and other audio devices, multi-media players, wireless Internet devices, in-vehicle network devices, environmental control systems, cellular phone or other wireless communication devices, and the like.

In some embodiments, vehicular infotainment system 100 is integrated in or includes a head unit of an automotive stereo system, and may be configured as a subsystem of a vehicle control system associated with the vehicle and share computational resources therewith. In other embodiments, vehicular infotainment system 100 is implemented as a stand-alone or add-on feature, part of the original equipment manufacturer (OEM) controls of the vehicle, or a combination of both.

As shown, vehicular infotainment system 100 may include, without limitation, a central processing unit (CPU) 110, a graphics processing unit (GPU) 120, system memory 130, input devices 140, one or more display devices 150, storage 160, and a global positioning system (GPS) receiver 170.

In operation, the CPU 110 is the master processor of the infotainment system 110, controlling and coordinating operation of other system components. In particular, the CPU 110 receives input via input devices 140 and executes infotainment software 131 to output navigation and other infotainment-oriented information to display device 150.

CPU 110 may be any suitable programmable processor implemented as a CPU, an application-specific integrated circuit (ASIC), a field programmable gate array (FPGA), any other type of processing unit, or a combination of different processing units. In general, CPU 110 may be any technically feasible hardware unit capable of processing data and/or executing software applications to facilitate operation of vehicular infotainment system 100 as described herein. GPU 120 may be any suitable programmable or fixed function processor that accepts commands and data from CPU 110 and generates images for display on display device 150. System memory 130 stores, among other things, infotainment software 131, which includes, without limitation, software for controlling the different equipment and devices associated with infotainment system 110, described above. System memory 130 generally comprises storage chips such as random access memory (RAM) chips that store applications and data for processing by CPU 110.

Input devices 140 enable user 101 to provide input to vehicular infotainment system 100 and/or CPU 110. Thus, via user input devices 140, user 101 may select navigational targets, initiate telephone calls, and otherwise interact with vehicular infotainment system 100. User input devices 140 may include, without limitation, one or more microphones 141 and/or keypads 142. Microphone 141 enables voice-activated instructions to be received by vehicular infotainment system 100, while keypad 142 enables instructions to be entered via physical gestures on a touch-sensitive screen or actuation/depression of mechanical buttons. In some embodiments, keypad 142 may be configured as selectable alpha-numeric characters or soft keys displayed on a touch-sensitive screen. In such embodiments, the selectable alpha-numeric characters may be displayed by display device 150 or on a separate display device. Alternatively or additionally, keypad 142 may be configured with mechanical keys, such as a keyboard, or any other mechanical controller, such as a video gaming console. In some embodiments, one or more mechanical buttons of keypad 142 are located on the steering wheel of the vehicle or any other location separate from an alpha-numeric portion of the keyboard. For example, but without limitation, such separately located buttons may include on/off buttons, select buttons, mode change buttons, and the like.

Display device 150 may be a video display screen configured to present video media to user 101, such as output from a back-up camera, navigation information, entertainment content, environmental control system information, etc. Display device 150, along with one or more user input devices 140, may be integrated into a dashboard of the vehicle associated with vehicle infotainment system 100 or as an instrument cluster display. In some embodiments, display device 150 is not incorporated into vehicle infotainment system 100, and may instead be a separate device. For example, and without limitation, display device 150 may be a component of a stand-alone navigation system. In some embodiments, display device 150 is configured with a touch-sensitive screen, and consequently may also be used as an input device by user 101. For example, and without limitation, in such embodiments, user 101 may make selections and/or enter data into vehicle infotainment system 100 via the touch interface 142 of display device 150. Embodiments of display device 150 are described in greater detail below in conjunction with FIGS. 2 and 3.

In various embodiments, storage 160 includes non-volatile memory such as optical drives, magnetic drives, flash drives, or other storage. GPS receiver 170 determines global position of the vehicle associated with vehicular infotainment system 100 based on one or more GPS satellites, various electromagnetic spectrum signals (such as cellular tower signals, wireless Internet signals, and the like), or other signals or measurements, or on a combination of the above items. In various embodiments, infotainment software 131 accesses global positioning information from GPS receiver 170 to determine a current location of the vehicle.

Figure 2:
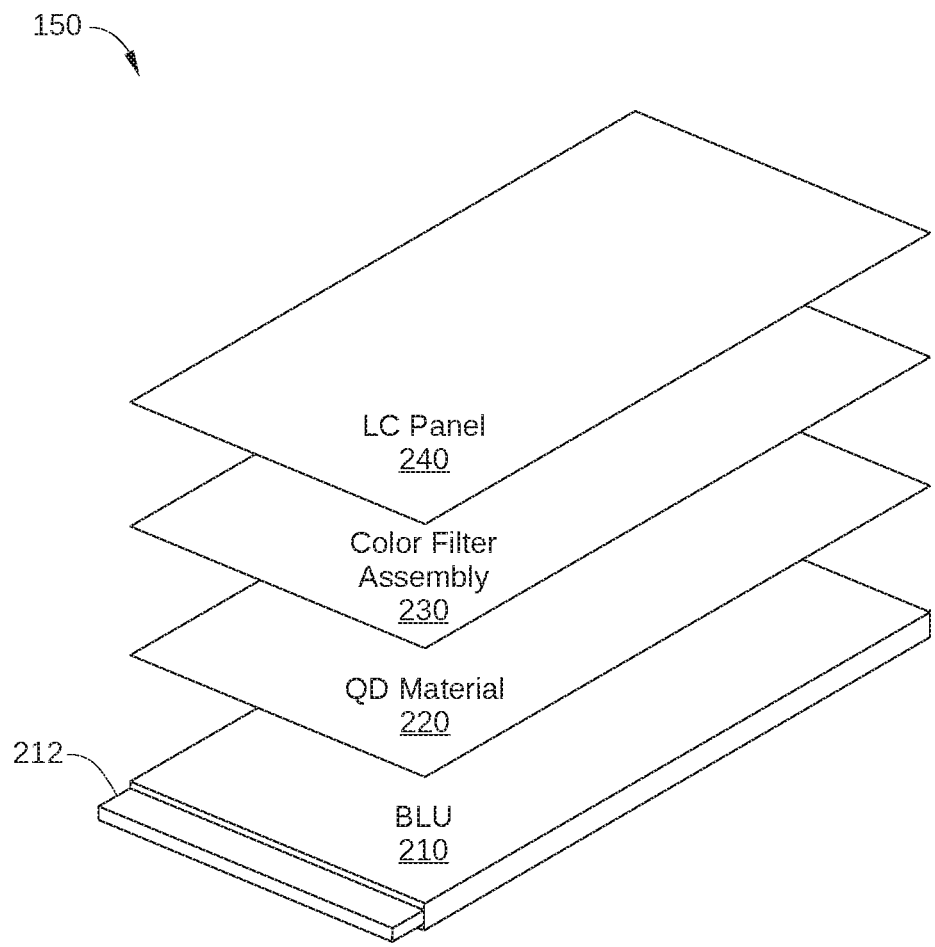
FIG. 2 is an exploded view of a display device of the vehicular infotainment system of FIG. 1, according to the various embodiments.
Figure 3:
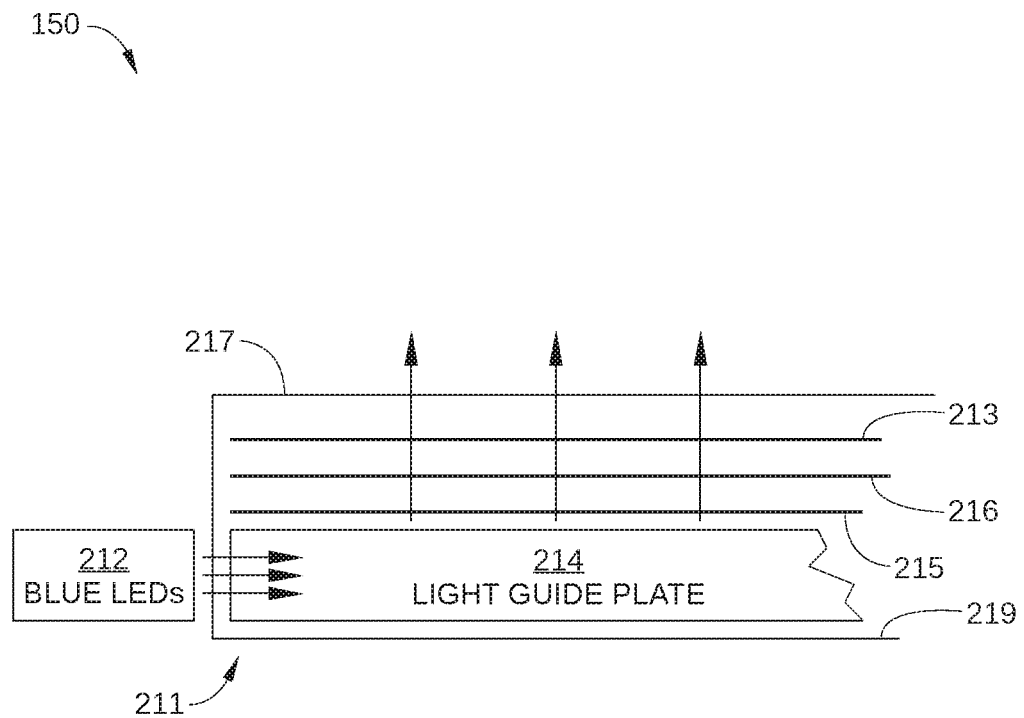
FIG. 3 is a partial schematic side view of the display device of the vehicular information system of FIG. 1, according to the various embodiments.

FIG. 2 is an exploded view of display device 150, according to various embodiments, and FIG. 3 is a partial schematic side view of display device 150, according to various embodiments. Display device 150 includes, without limitation, a back light unit (BLU) 210, a quantum dot (QD) material 220, a color filter assembly 230, and a liquid crystal (LC) panel 240, arranged as shown.

In the embodiment illustrated in FIGS. 2 and 3, BLU 210 provides an evenly-lit surface that acts as a light source of blue, polarized light for display device 150. BLU 210 may include, without limitation, a back panel 211 and a plurality of blue light-emitting diodes (LEDs) 212 disposed on one or more edges of back panel 211, such as gallium nitride (GaN) LEDs. In some embodiments, the blue light that is emitted by blue LEDs 212 and directed into back panel 211 has a wavelength between about 450 nm and about 495 nm. In some embodiments, the plurality of blue LEDs may be disposed on two opposing internal edges of back panel 211, or on all four internal edges of back panel 211.

Back panel 211 may include, without limitation, a reflector panel 219 disposed on the rear surface of back panel 211, at least one polarizing filter 213, a light guide plate 214, a diffuser film 215, and a prism film 216. Alternatively, light guide plate 214 and diffuser film 215 may be combined as a light diffuser element. For clarity, polarizing filter 213, light guide plate 214, diffuser film 215, and prism film 216 are omitted from FIG. 2. Polarizing filter 213 properly polarizes light emitted from BLU 210, and is typically positioned between QD substrate 220 and BLU 210. Light guide plate 214 evenly distributes incident light from blue LEDs 212 across an emission surface 217 of BLU 210, via total internal reflection and in combination with extraction features incorporated in light guide plate 214 (such as a dot or groove pattern). Diffuser film 215 eliminates the dot pattern that may be included in light emitted from light guide plate 214, and prism film 216 increases the perpendicular component of the direction vector of emitted light to emission surface 217, since light typically emerges from light guide plate 214 at various angles. Thus, while light produced by blue LEDs 212 may enter back panel 211 along one or more edges, the blue polarized light leaving BLU 210 via emission surface 217 is bright and uniform in intensity, and somewhat perpendicular to emission surface 217.

QD substrate 220 converts part of the light emitted by BLU 210 into relatively pure green light and red light by the appropriately configured quantum dots, thereby enabling an efficient display with enhanced color properties. For example, in some embodiments, QD substrate 220 is an organic substrate, such as a polyimide film, in which quantum dots or quantum rods are embedded. A quantum dot is a semiconductor nanocrystal that is small enough to exhibit quantum mechanical properties, where the electronic characteristics of the quantum dot are closely related to the size and shape of the quantum dot. Specifically, the band gap in a quantum dot, which determines the frequency range of emitted light, is inversely related to the size of the quantum dot, so that larger quantum dots emit longer wavelengths (e.g., red), while smaller quantum dots emit shorter wavelengths (e.g., green). Consequently, when a suitable number of quantum dots of a suitable size, shape, and composition are embedded in QD substrate 220, a selected portion of incident blue light from BLU 210 is converted into red light and into green light.

Because quantum dots naturally produce monochromatic light, they can be used to generate a spectrum of light that can be accurately matched with the colors of the filters in color filter assembly 230. Consequently, BLU 210, in conjunction with QD substrate 220, can provide a more efficient light source than white-LED-based light sources, which generally must be color filtered to produce white light. In addition, in contrast to the white light produced by a white-LED-based BLU, the white light produced by the combination of BLU 210 and QD substrate 220 allows for an improved color gamut, since the wavelengths of the green and red components can be selected by quantum dot geometry to be more saturated colors. This is because the more saturated red and green light generated by BLU 210 (in conjunction with QD substrate 220) enable a significantly wider gamut to be realized than when using the filtered red and green light available from white-LED-based light sources.

In the embodiment illustrated in FIGS. 2 and 3, QD substrate 220 is depicted as a separate structure from BLU 210. In some embodiments, however, QD substrate 220 may be included as an additional layer of BLU 210. In such embodiments, polarizing filter 213 may be positioned between QD substrate 220 and light guide plate 214, or between QD substrate 220 and LC panel 240. Alternatively, QD substrate 220 may be incorporated into one of the elements of BLU 210, such as polarizing filter 213, diffuser film 215, or prism film 216. A suitable configuration of QD substrate 220 can be acquired from various manufacturers, including, but not limited to, 3M and Dow Chemical.

Color filter assembly 230 includes a filter that is configured as a short-wavelength pass filter with a passband configured to transmit light having a wavelength that falls within multiple predetermined wavelength ranges, thereby selectively passing light of a small range of colors while reflecting other colors. For example, in some embodiments, color filter assembly 230 is configured to be substantially transparent to red light (i.e., light having a wavelength at or near 650 nm), green light, (i.e., light having a wavelength at or near 510 nm) and blue light (i.e., light having a wavelength at or near 475 nm), while reflecting other visible light wavelengths. In some embodiments, color filter assembly 230 includes, without limitation, a dichroic filter. In the embodiment illustrated in FIGS. 2 and 3, color filter assembly 230 is depicted as a single substrate, such as a glass substrate with multiple coatings or films deposited thereon.

Color filter assembly 230 ensures that the light incident on LC panel 240 is white light that is substantially equivalent to the International Commission on Illumination (CIE) Standard Illuminant D65. That is, the difference in the white light incident on LC panel 240 light and CIE Standard Illuminant D65 is not detectable to the human eye. To that end, the passbands of color filter assembly 230 are selected so that light that is emitted by BLU 210 is such white light and passes through color filter assembly 230. Thus, a portion of the light emitted by BLU 210 is converted to preferred frequencies of red and green light by QD substrate 220. In some embodiments, the passband of color filter assembly 230 that is associated with red light is generally matched to the red light emission of QD substrate 220 when illuminated by BLU 210, the passband of color filter assembly 230 that is associated with green light is generally matched to the green light emission of QD substrate 220 when illuminated by BLU 210, and the passband of color filter assembly 230 that is associated with blue light is generally matched to the light emitted by BLU 210. Thus, less optical energy is lost compared to the color filtering associated with white-LED-based BLUs.

Figure 4:
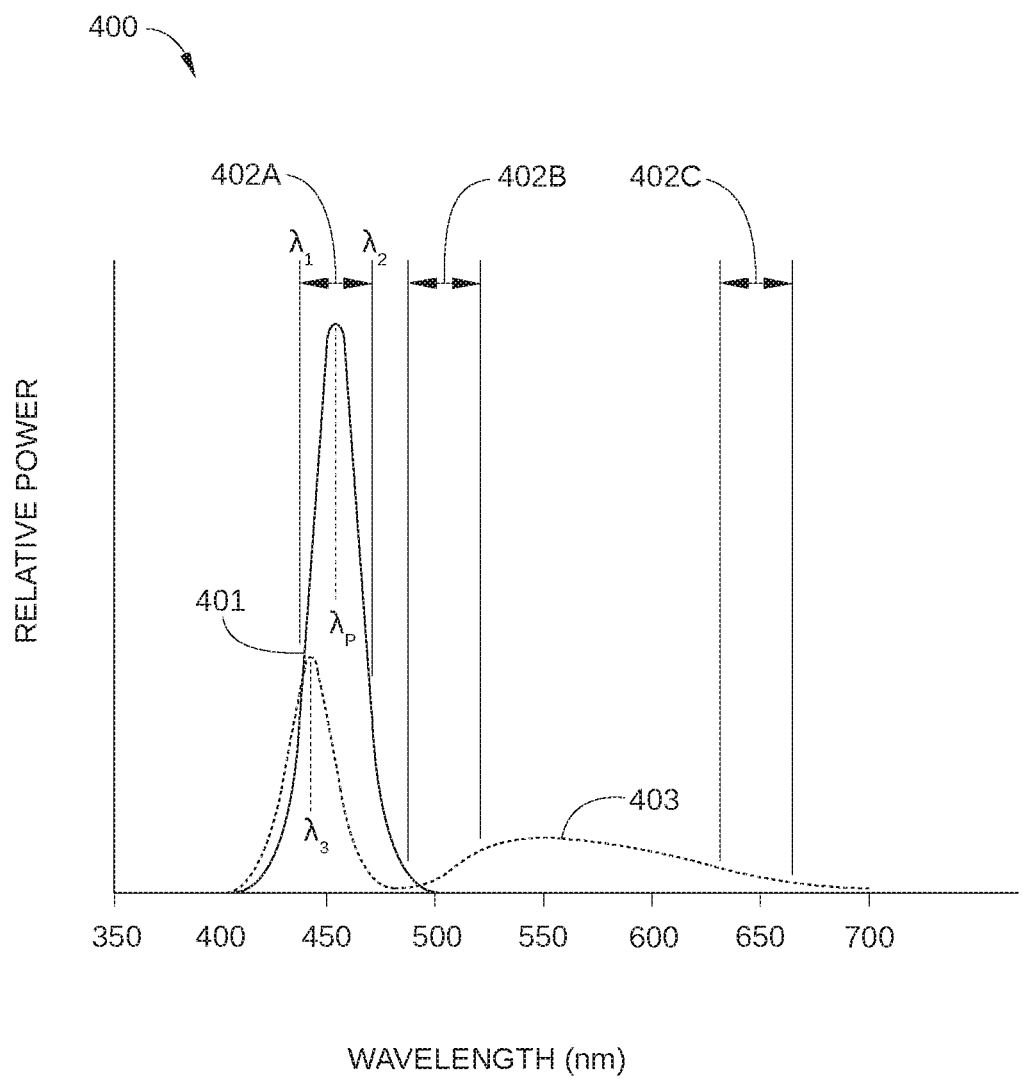
FIG. 4 is a graph illustrating the spectral power distribution of a light source juxtaposed with the multiple passbands of a color filter assembly included in the display device of FIGS. 2 and 3, according to the various embodiments.

In some embodiments, a passband of color filter assembly 230 is considered to be matched to a particular light emission when a peak frequency of the light emission falls within a passband of the color filter, as illustrated in FIG. 4. FIG. 4 is a graph 400 illustrating the spectral power distribution 401 of a light source juxtaposed with the multiple passbands 402A-402C of color filter assembly 230. As shown, passband 402A is in the blue light regime, passband 402B is in the green light regime, and passband 402C is in the red light regime. For purposes of illustration, spectral power distribution 401 depicts a spectral power distribution of a typical blue LED 212. However, the herein described matching of passband 402A to the light emission associated with spectral power distribution 401 is equally applicable to the matching of passband 402C of color filter assembly 230 to the red light emission of QD substrate 220 or the matching of passband 402B of color filter assembly 230 to the green light emission of QD substrate 220. This is because the red light emission of QD substrate 220 and the green light emission of QD substrate 220 are both narrow-band emissions with distinctive peak wavelengths.

As shown, spectral power distribution 401 depicts the variation in relative optical power for a typical blue LED 212, which is a narrow-band light source. For this particular light source, and for narrow-band light sources in general, such as quantum dots and many LEDs, spectral power distribution 401 includes a distinct peak wavelength $\lambda_P$. Also shown are passbands 402A-402C, which indicate the various ranges of wavelengths that can pass through color filter assembly 230, i.e., red light, green light, and blue light. In the blue light regime, passband 402A extends from a lower wavelength $\lambda_1$, for example and without limitation 440 nm, to an upper wavelength $\lambda_2$, for example and without limitation 470 nm. Because a peak wavelength $\lambda_P$ of blue LEDs 212, in this embodiment, is within passband 402C, the passband is considered "matched to" or "tuned to" the light source associated with spectral power distribution 401 and vice versa. Consequently, the majority of optical energy associated with the light source (i.e., blue LEDs 212) passes through color filter assembly 230 and is not lost.

Similarly, when passband 402B is suitably matched to the green light emissions of QD substrate 220, the majority of optical energy associated with the green light emissions of QD substrate 220 is not attenuated. Furthermore, when passband 402C is suitably matched to the red light emissions of QD substrate 220, the majority of optical energy associated with the red light emissions of QD substrate 220 is not attenuated.

It is noted that while spectral power distribution 401 may be considered qualitatively representative of a spectral power distribution associated with the red light emission of QD substrate 220, the green light emission of QD substrate 220, or blue light emitted by BLU 210, spectral power distribution 401 varies significantly from the spectral power distribution of a typical white LED light source. For reference, spectral power distribution 403 of a typical white LED light source is also depicted in FIG. 4. As shown, spectral power distribution 403 includes a peak wavelength $\lambda_3$ approximately corresponding to blue light, and a broad secondary peak 404, that does not correspond to either green light (at ca. 510 nm) or red light (at ca. 650 nm). Consequently, neither passband 402B (associated with passing green light) of color filter assembly 230 nor passband 402C (associated with passing red light) of color filter assembly 230 can be matched to the light emitted by a white LED light source.

In some embodiments, the above-described matching of passband 402B and the green light emission of QD substrate 220 may be accomplished by designing passband 402B to correspond to wavelengths of the green light emission of QD substrate 220 when illuminated by BLU 210. In other embodiments, the configuration of quantum dots of QD substrate 220 (e.g., quantum dot size, shape, and/or composition) may be selected so that wavelengths of the green light emission of QD substrate 220, when illuminated by BLU 210, correspond to passband 402B. In yet other embodiments, both passband 402B and the configuration of quantum dots of QD substrate 220 are selected to correspond to a target wavelength band, such as a wavelength or wavelengths of green light that enhance the color gamut of display device 150. The matching of passband 402C and the red light emission of QD substrate 220 may be similarly accomplished.

Returning now to FIGS. 2 and 3, LC panel 240 is the liquid-crystal portion of display device 150, and may be a thin-film-transistor liquid-crystal display (TFT LCD). LC panel 240 is configured to generate images for display by selectively allowing a targeted quantity of light through each subpixel of LC panel 240. For example, and without limitation, each subpixel of LC panel 240 may include, without limitation, a liquid crystal that controls the intensity of light allowed to pass though the subpixel. Liquid crystals suitable for use in LC panel 240 include, without limitation, a twisted nematic liquid crystal, a multi domain view alignment (MVA) liquid crystal, or an in-panel switching IPS type liquid crystal. In some embodiments, a touch-sensitive panel or other gesture-sensitive structure configured for receiving various input techniques (for example and without limitation, infra-red touch or other like techniques) may be disposed on the outer surface of LC panel 240.

LC panel 240 also includes, without limitation, a color subpixel array that defines the color of each subpixel of LC panel 240, where each pixel includes a red, green, and blue subpixel. The color subpixel array includes, without limitation, a plurality of red, green, and blue color filters that are arranged to overlay the subpixels of LC panel 240. Generally, the color filter array of LC panel 240 is formed on a single substrate, and is configured so that a red filter is aligned with each red sub-pixel of LC panel 240, a green filter is aligned with each green sub-pixel of LC panel 240, and a blue filter is aligned with each blue sub-pixel of LC panel 240. The wavelength band associated respectively with the red, green, and blue filters of the color subpixel array is generally selected so that when a maximum intensity of light from BLU 210 is allowed to pass through all three light filters of a particular pixel of LC panel 240, white light is generated that corresponds as closely as practicable to the CIE Standard Illuminant D65.

Figure 5:
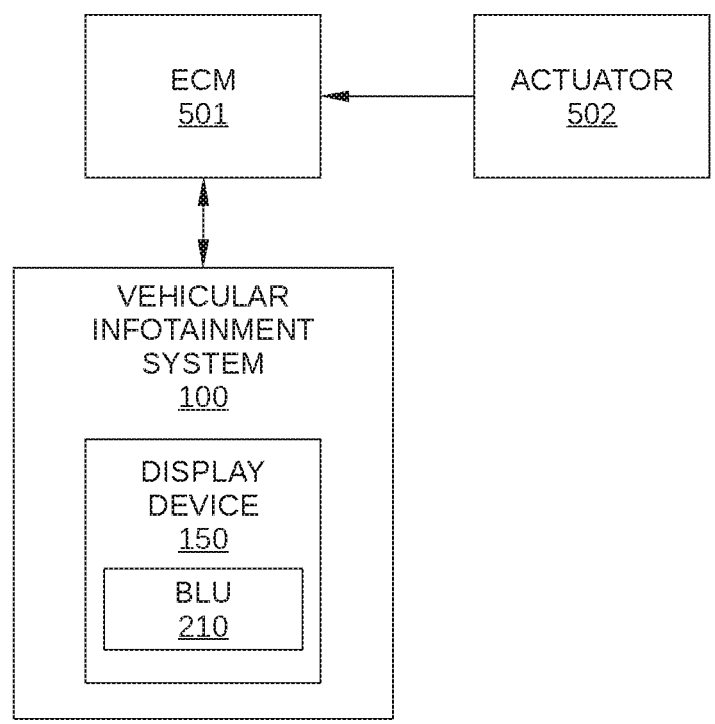
FIG. 5 is a block diagram illustrating the vehicular infotainment system of FIG. 1 in communication with an electronic control module of a vehicle, according to the various embodiments.

FIG. 5 is a block diagram illustrating vehicular infotainment system 100 in communication with an electronic control module (ECM) 501 of a vehicle, according to the various embodiments. As shown, in some embodiments, vehicular infotainment system 100 is in communication with an electronic control module 501 that is associated with a vehicle that includes vehicular infotainment system 100. In addition, electronic control module 501 is further in communication with an actuator 502 that is also associated with the vehicle. Actuator 502 may be incorporated in a key fob associated with the vehicle, an ignition switch for the vehicle, or the like. The key fob may be configured to implement remote keyless entry, which also signals activation of the ECM. Alternatively, the key fob may include a physical key which engages with the ignition switch and in turn activates the ECM. Upon receiving a signal from actuator 502, ECM 501 may transmit a "wake signal" to vehicular infotainment system 100, such that BLU 210 in display device 150 is powered on. This arrangement provides for an enhanced infotainment display in a vehicle that can withstand the extreme temperature and humidity conditions that may be experienced in the vehicle.

In some embodiments, a display device includes a nanocrystal material is disposed on an output surface of a light source, rather than on a film disposed adjacent to a color filter assembly and an LC panel. In such embodiments, the quantity of nanocrystal material employed in the display device is greatly reduced and the efficiency of blue light conversion is increased. One such embodiment is illustrated in FIGS. 6 and 7.

Figure 6:
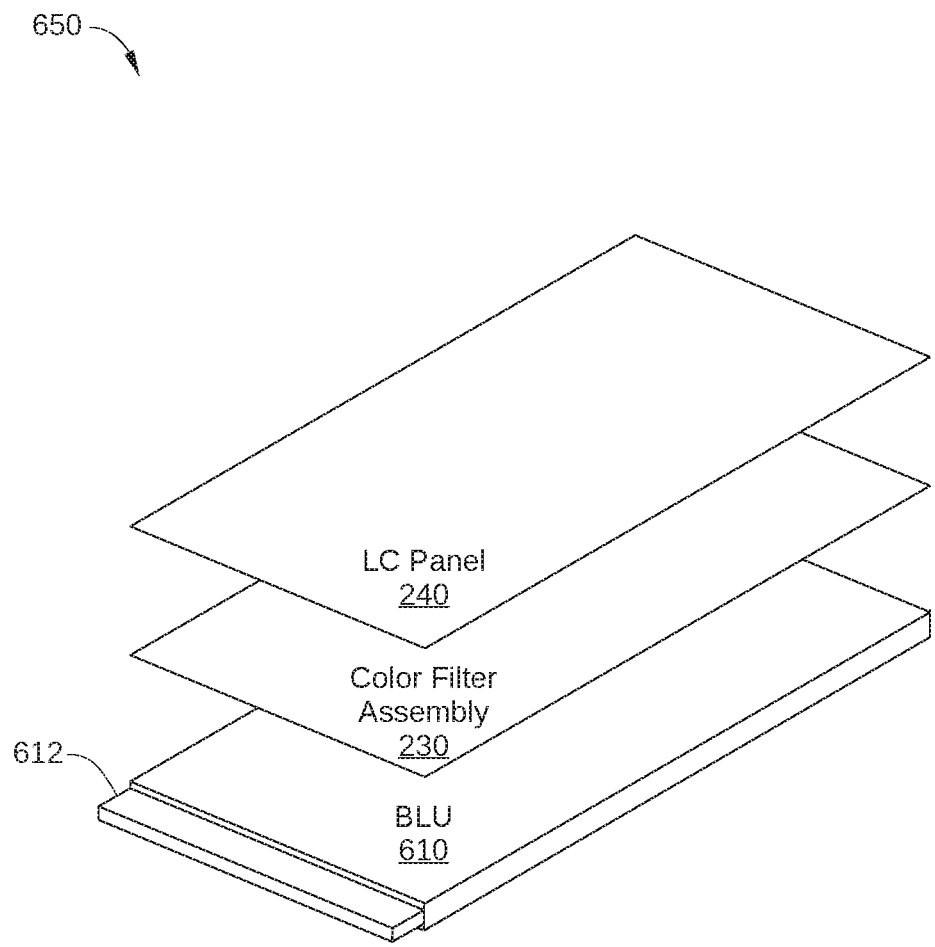
FIG. 6 is an exploded view of a display device, according to the various embodiments.
Figure 7:
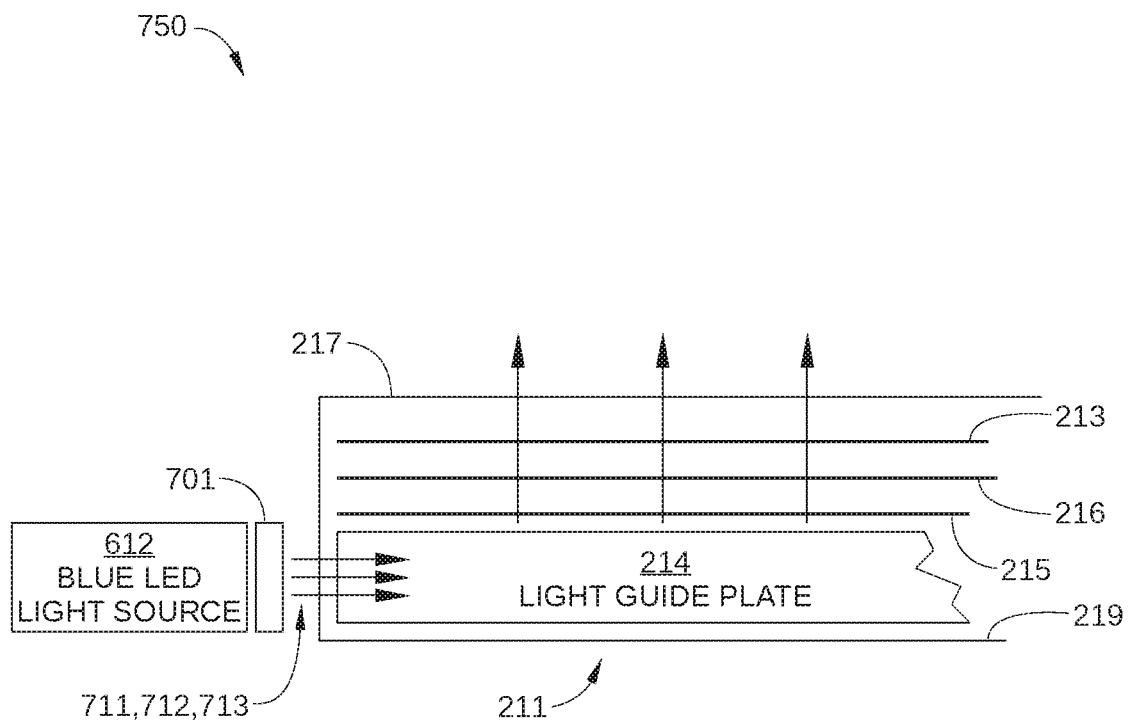
FIG. 7 is a partial schematic side view of the display device of FIG. 6, according to the various embodiments.

FIG. 6 is an exploded view of a display device 650, according to the various embodiments. FIG. 7 is a partial schematic side view of display device 650, according to the various embodiments. Display device 650 is substantially similar to display device 150 in FIGS. 2 and 3, and therefore includes color filter assembly 230, LC panel 240, and a BLU 610 similar to BLU 210. However, unlike BLU 210, BLU 610 of display device 650 includes a nanocrystal material 701 that is disposed on an output surface of a blue LED light source 612. For example, in embodiments in which blue LED light source 612 is an array of multiple blue LEDs, nanocrystal material 701 can be disposed on an output or emission surface of the array. By contrast, display device 150 includes a QD-impregnated film that is included in the stack of layers forming display device 150, i.e., QD material 220 (shown in FIG. 2).

BLU 610 includes, without limitation, back panel 211, blue LED light source 612, polarizing filter 213, light guide plate 214, diffuser film 215, prism film 216, and reflector panel 219. Blue LED light source 612 is disposed along one or more edges of back panel 211 and includes one or more blue LEDs, such as blue LEDs 212.

Blue LED light source 612 generates blue output light (not shown for clarity) that is immediately or almost immediately incident on nanocrystal material 701. Similar to the above-described QD substrate 220, nanocrystal material 701 is configured to convert part of the light emitted by blue LED light source 612 into relatively pure green light 711 and red light 712 by the appropriately configured quantum dots, and transmit a remainder portion 713 of the blue light generated by blue LED light source 612. In this way, an efficient display with enhanced color properties is enabled. It is noted that the blue light generated by blue LED light source 612 is converted to green light 711 and red light 712 before transmission through the various downstream components of display device 650, including polarizing filter 213, light guide plate 214, diffuser film 215, and prism film 216. Consequently, green light 711 and red light 712 are generated prior to the significant optical losses that occur as light is transmitted though polarizing filter 213, light guide plate 214, diffuser film 215, and prism film 216, thereby improving efficiency of light conversion by nanocrystal material 701.

In the embodiment illustrated in FIG. 6, blue LED light source 612 includes a plurality of blue LEDs arranged, for example, as an LED light bar. In such embodiments, nanocrystal material 701 may be a film that includes quantum dots or other nanocrystal structures, and is formed on an output surface 602 of blue LED light source 612. For example, nanocrystal material 701 may be a film on which quantum dots or other nanocrystal structures are formed or deposited. Alternatively or additionally, nanocrystal material 701 may be a film in which quantum dots or other nanocrystal structures are embedded. In either case, nanocrystal material 701 may be configured as an adhesive film that is attached to output surface 602. Alternatively, nanocrystal material 701 may be a film or other nanocrystal material disposed between output surface 602 and light guide plate 214.

In the embodiment illustrated in FIGS. 6 and 7, nanocrystal material 701 is configured as a single film disposed on output surface 602 of blue LED light source 612. In other embodiments, a nanocrystal material may be deposited on an output surface of each blue LED included in blue LED light source 612. Various embodiments are illustrated in FIGS. 8A-8C.

Figure 8A:
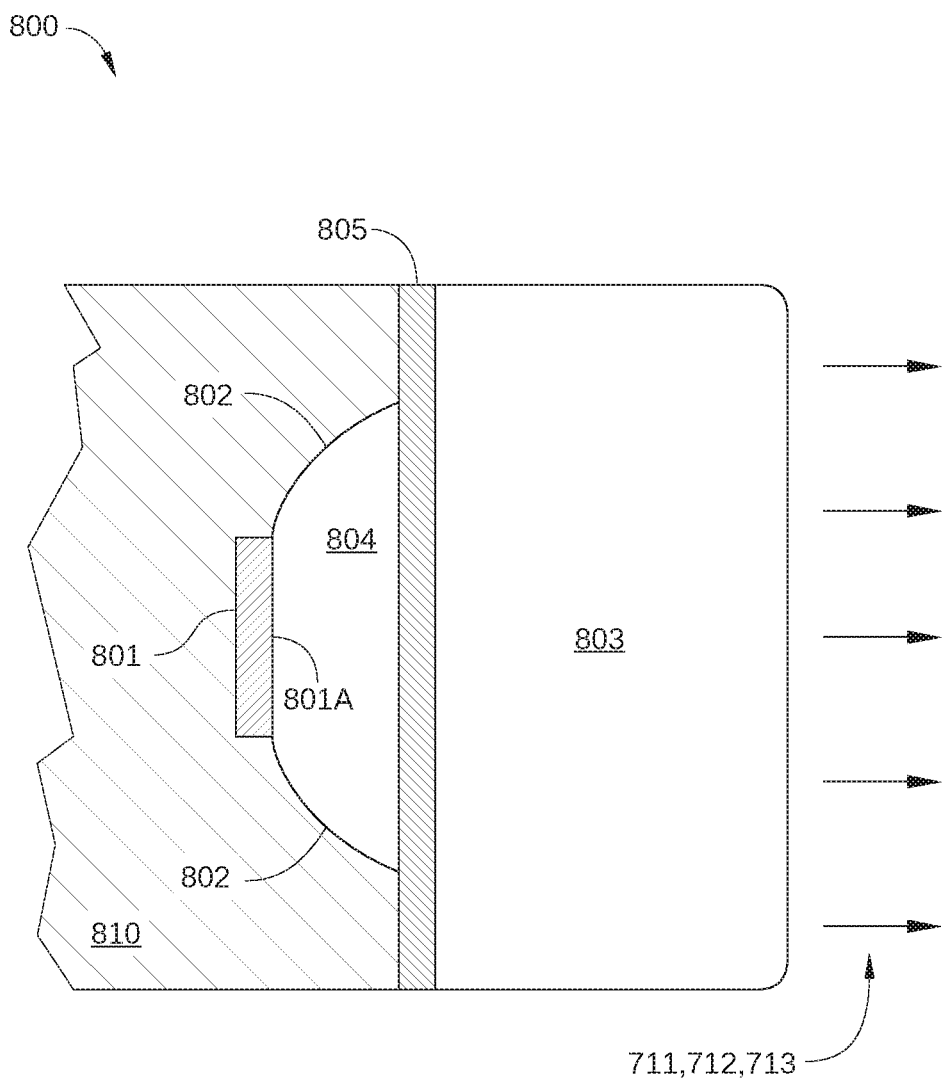
FIG. 8A is a partial schematic side view of an augmented blue LED that includes a quantum dot layer formed within an LED assembly, according to various embodiments.
Figure 8B:
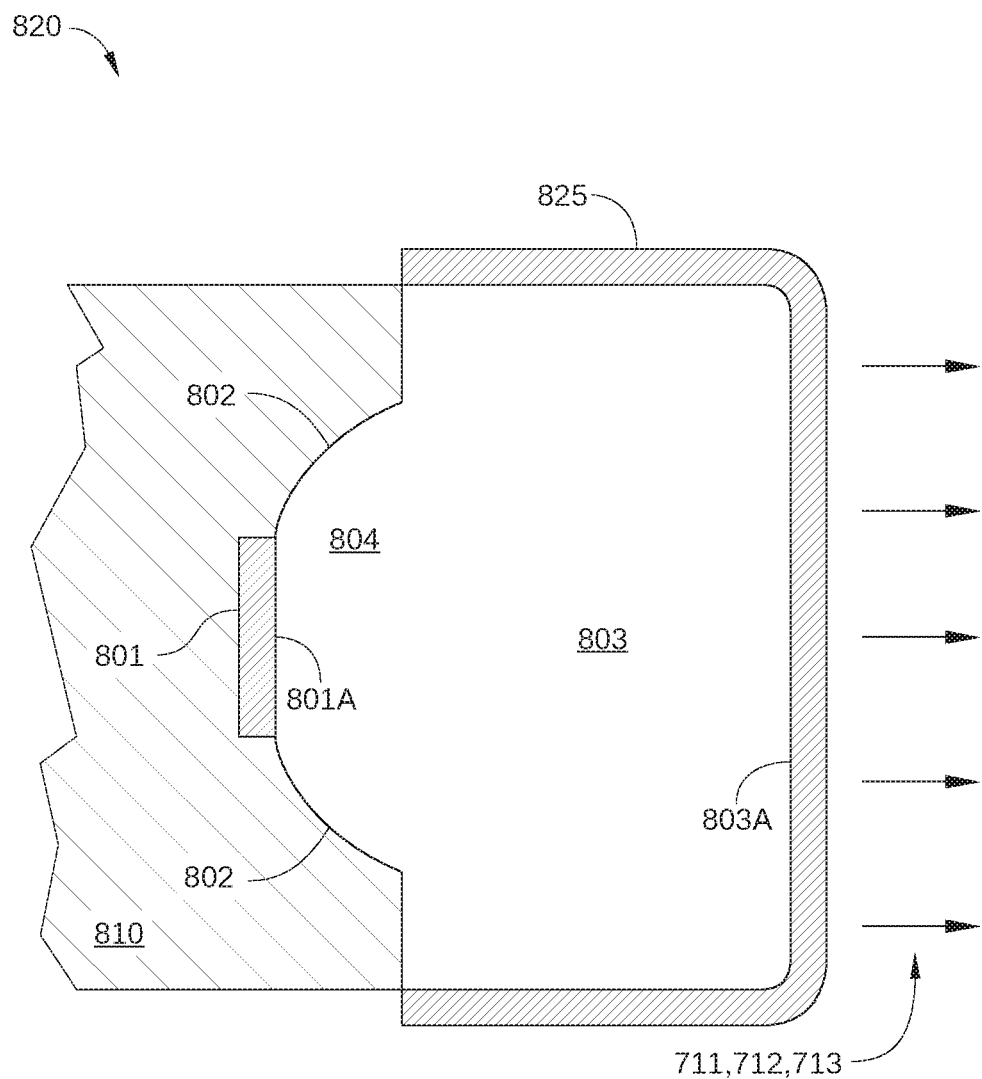
FIG. 8B is a partial schematic side view of an augmented blue LED that includes a quantum dot layer formed on an outer surface of an LED assembly, according to various other embodiments.
Figure 8C:
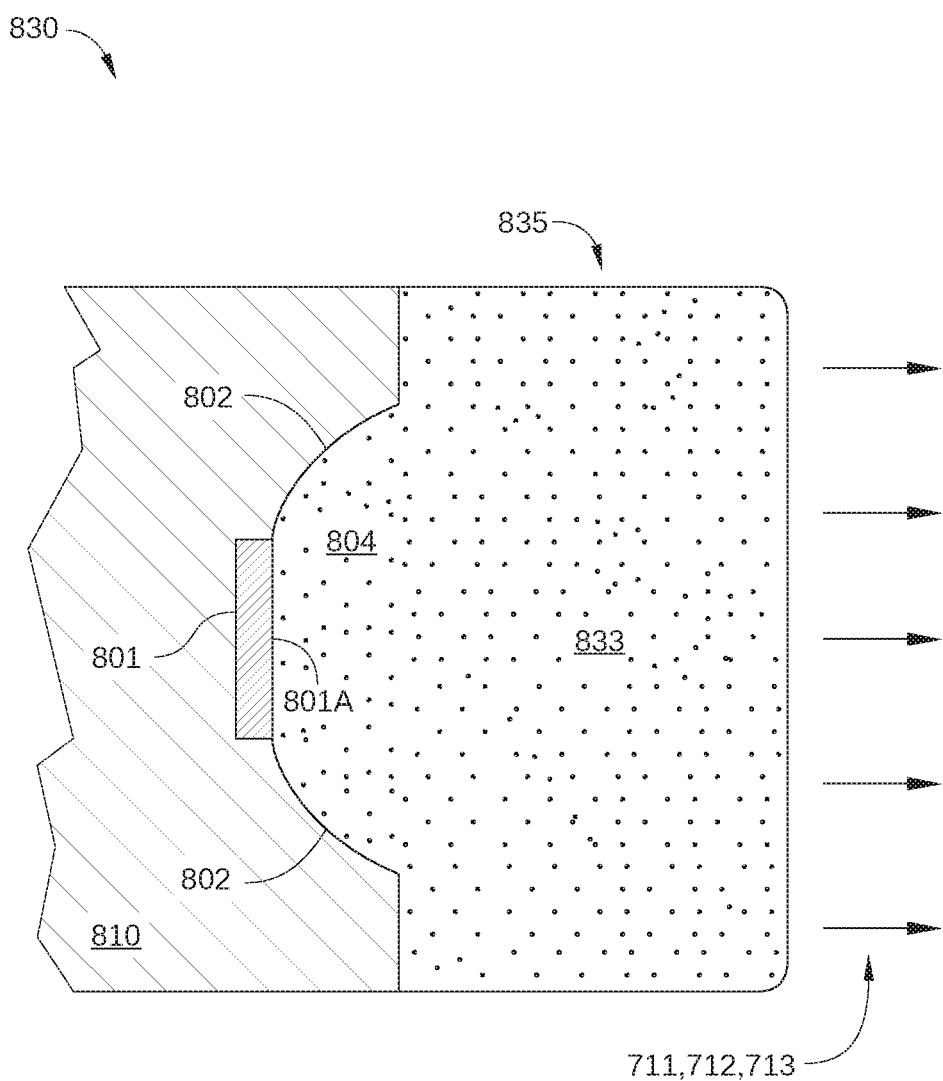
FIG. 8C is a partial schematic side view of an augmented blue LED that includes quantum dots or crystals formed within a transparent case of an LED assembly, according to various other embodiments.

FIG. 8A is a partial schematic side view of an augmented blue LED 800 that includes a quantum dot layer formed within an LED assembly, according to the various embodiments. Augmented blue LED 800 is an LED device that is configured to generate green light 711, red light 712, and remainder portion 713 of a blue LED light source that can be employed in a display device. Augmented blue LED 800 includes a semiconductor die 801 and reflectors 802 formed on a surface of a body 810. In addition, augmented blue LED 800 includes a transparent case 803 disposed on body 810 that covers and protects semiconductor die 801 and reflectors 802. Augmented blue LED 800 further includes a quantum dot layer 805.

Semiconductor die 801 includes one or more LED devices configured to emit blue light, for example having a wavelength between about 450 nm and about 495 nm. Reflectors 802 direct light emitted by semiconductor die 801 away from augmented blue LED 800, for example toward a light guide plate of a display device. Reflectors 802 form a reflecting cavity 804 that may be filled with a transparent encapsulant or may be an empty cavity. Transparent case 803 may be formed from an epoxy, plastic, or any other suitable material that is transparent to light emitted from semiconductor die 801 and, in some embodiments, to light emitted by quantum dot layer 805. In some embodiments, transparent case 803 is also configured as a lens to direct and/or concentrate light emitted by semiconductor die 801 as appropriate.

Quantum dot layer 805 includes appropriately configured quantum dots or other nanocrystal structures for converting blue light emitted by semiconductor die 801 into green light 711 and red light 712. Quantum dot layer 805 may have any suitable configuration that positions quantum dots or other nanocrystal structures in the path of light emitted by semiconductor die 811. In some embodiments, reflecting cavity 804 may be filled with a transparent encapsulant and quantum dot layer 805 may be formed via the deposition of quantum dots onto the transparent encapsulant. Alternatively, in some embodiments, quantum dot layer 805 may include a quantum dot-containing film that is applied to the transparent encapsulant. Alternatively, in some embodiments quantum dot layer 805 may include a plate on which quantum dots or other nanocrystal structures are deposited or in which quantum dots or other nanocrystal structures are embedded. Alternatively, in some embodiments quantum dot layer 805 may be formed directly on a light-emitting surface 801A of semiconductor die 801, for example via sputter deposition.

FIG. 8B is a partial schematic side view of an augmented blue LED 820 that includes a quantum dot layer formed on an outer surface of an LED assembly, according to the various embodiments. Augmented blue LED 820 is substantially similar to augmented blue LED 800 of FIG. 8A, except that augmented blue LED 820 does not include a quantum dot layer formed within transparent case 803 or on semiconductor die 801, as is the case with quantum dot layer 805. Instead, augmented blue LED 820 includes a quantum dot layer 825 formed on an outer surface 803A of transparent case 803. In some embodiments, quantum dot layer 825 is a layer of material that is deposited on outer surface 803A and includes quantum dots and/or other nanocrystal structures for converting incident blue light into green light 711 and red light 712. Alternatively, quantum dot layer 825 may include a film with quantum dots and/or other nanocrystal structures embedded within that is applied to outer surface 803A.

FIG. 8C is a partial schematic side view of an augmented blue LED 830 that includes quantum dots or crystals formed within a transparent case of an LED assembly, according to the various embodiments. Augmented blue LED 830 is substantially similar to augmented blue LED 800 of FIG. 8A, except that augmented blue LED 830 does not include a quantum dot layer formed within transparent case 803 or on semiconductor die 801, as is the case with quantum dot layer 805. Instead, some or all of a transparent case 833 includes quantum dots and/or nanocrystal structures 835 embedded within. As shown, quantum dots and/or nanocrystal structures 835 convert a portion of blue light emitted from semiconductor die 801 into green light 711 and red light 712, and allow remainder portion 713 to be and transmitted through transparent case 833.

In some embodiments, the blue LED light source of a display device is positioned away from the touch-sensitive surface of the display device, reducing heating of the touch surface along the edge or edges of the display device. As a result, the touch-sensitive surface of the display screen is significantly reduced in temperature during operation, thereby preventing or reducing the "hot finger" effect. Thus, the user experience is improved, and thermal stress on sensitive components of the display device is lowered, extending the lifetime of the display device.

Figure 9:
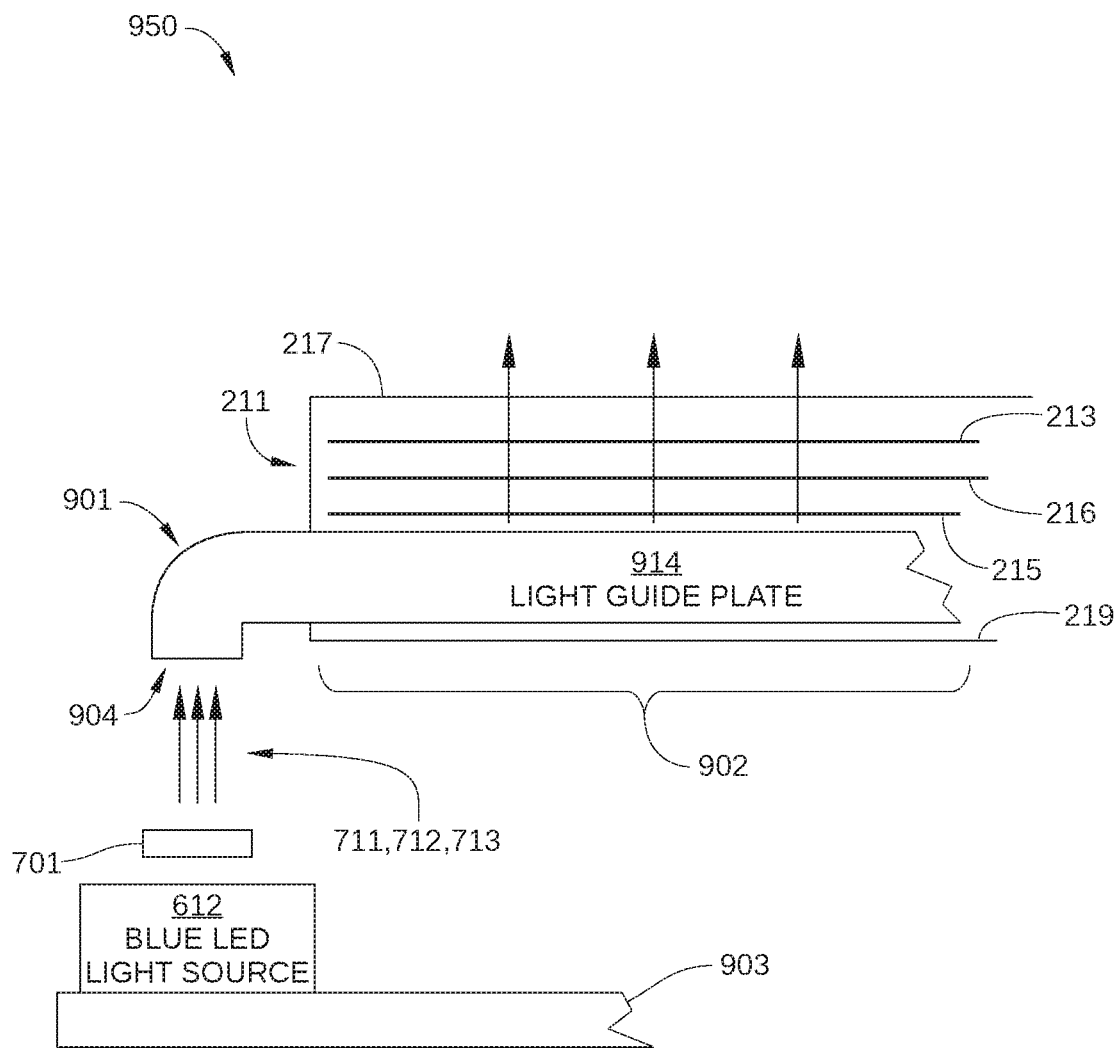
FIG. 9 is a partial schematic side view of a display device that includes a curved light guide plate, according to the various embodiments.

In some embodiments, the blue LED light source of a display device is positioned away from the touch-sensitive surface of the display device via a curved light guide, as shown in FIG. 9. FIG. 9 is a partial schematic side view of a display device 950 that includes a curved light guide plate 914, according to the various embodiments. With the exception of curved light guide plate 914, display device 950 is similar in configuration and operation to display device 650 in FIGS. 6 and 7.

Curved light guide plate 914 includes an elbow portion 901 and a planar portion 902 that are optically coupled to each other. Elbow portion 901 enables light emitted by blue LED light source 612 to enter curved light guide plate 914 while traveling in one direction, and to be transmitted into and through planar portion 902 of curved light guide plate 914 in another direction, i.e., in the plane of planar portion 902. Consequently, blue LED light source 612 can be positioned remotely from the touch-sensitive surface (not shown in FIG. 9) of display device 950, and outside of a region defined between (i) a first plane defined by a front surface of planar portion 902, and (ii) a second plane defined by a rear surface of planar portion 902 that opposes the front surface. For example, in the embodiment illustrated in FIG. 9, elbow portion 901 enables blue LED light source 612 to be mounted on a printed circuit board 903 that is positioned remote from and substantially parallel to planar portion 902. In some embodiments, printed circuit board 903 is located external to back panel 211 as shown, thereby further reducing thermal stress on temperature-sensitive components of display device 950. In other embodiments, printed circuit board 903 is located internally in back panel 211, but is still more remote from the touch-sensitive surface of display device 950 than blue LED light source 612 is from the touch-sensitive surface of display device 650, as shown in FIGS. 6 and 7.

In the embodiment illustrated in FIG. 9, elbow portion 901 includes a 90-degree bend. In other embodiments, elbow portion 901 can include a bend of any suitable angle, up to and including 180 degrees or more. In such embodiments, elbow portion 901 can be configured to transmit light that enters curved light guide plate 914 (at a surface 904) to planar portion 902 via total internal reflection (TIR). For example, green light 711, red light 712, and remainder portion 713 are emitted by blue LED light source 612 and nanocrystal material 701, are generally directed towards surface 904. Green light 711, red light 712, and remainder portion 713 are then transmitted through elbow 901 via TIR into planar portion 902. In such embodiments, light guide plate 914 can be formed from any suitable optically transparent material that enables TIR of light incident on surface 904 into planar portion 902. Alternatively, in some embodiments, elbow portion 901 includes a prism or any other suitable optical element or elements that enable light incident on surface 904 to be transmitted along planar portion 902 of curved light guide plate 914.

Figure 10:
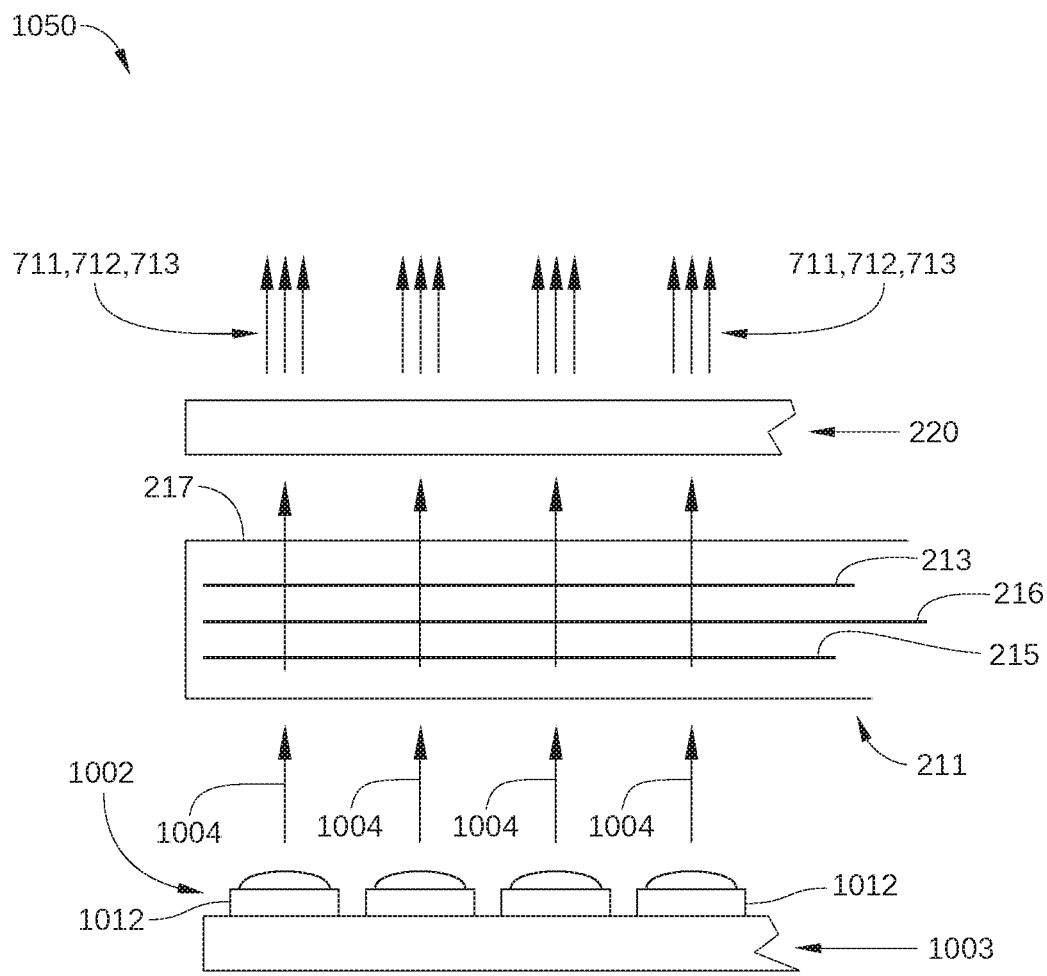
FIG. 10 is a partial schematic side view of a display device that includes a planar array of blue LEDs, according to the various embodiments.

In some embodiments, the blue LED light source of a display device is positioned away from the touch-sensitive surface of the display device by arranging the blue LEDs of the blue LED light source in a planar array 1002 of blue LEDs 1012, as shown in FIG. 10. FIG. 10 is a partial schematic side view of a display device 1050 that includes a planar array 1002, according to the various embodiments. Display device 1050 is similar in configuration and operation to display device 650 in FIGS. 6 and 7, with the exception of the addition of planar array 1002 and the removal of blue LED light source 612, light guide plate 214, and reflector panel 219.

Planar array 1002 includes a plurality of blue LEDs 1012 that can be substantially similar to blue LEDs 212 in FIG. 2. Blue LEDs 1012 emit blue light 1004 that is directed to diffuser film 215, prism film 216, and polarizing filter 213 of back panel 211 as shown. After passing through diffuser film 215, prism film 216, and polarizing filter 213, blue light 1004 is incident on QD substrate 220, so that green light 711, red light 712, and remainder portion 713 are emitted and directed toward color filter assembly 230 (not shown) and LC panel 240 (not shown). Blue LEDs 1012 are located more remotely from the touch-sensitive surface of display device 1050 than the LEDs of blue LED light source 612. In addition, blue LEDs 1012 are distributed across a larger area than the blue LEDs of blue LED light source 612. Consequently, for both of these reasons, the touch-sensitive surface of display device 1050 undergoes less heating and thermal stress than that of a display device that includes a blue LED light source disposed on one or more edges of the display device.

In some embodiments, planar array 1002 is mounted on a printed circuit board 1003 that is positioned substantially parallel to back panel 211. In some embodiments, printed circuit board 1003 is located external to back panel 211 as shown, thereby further reducing thermal stress on temperature-sensitive components of display device 1050. In other embodiments, printed circuit board 1003 is located internally in back panel 211, but is still more remote from the touch-sensitive surface of display device 1050 than blue LED light source 612 is from the touch-sensitive surface of display device 650, as shown in FIGS. 6 and 7.

Figure 11:
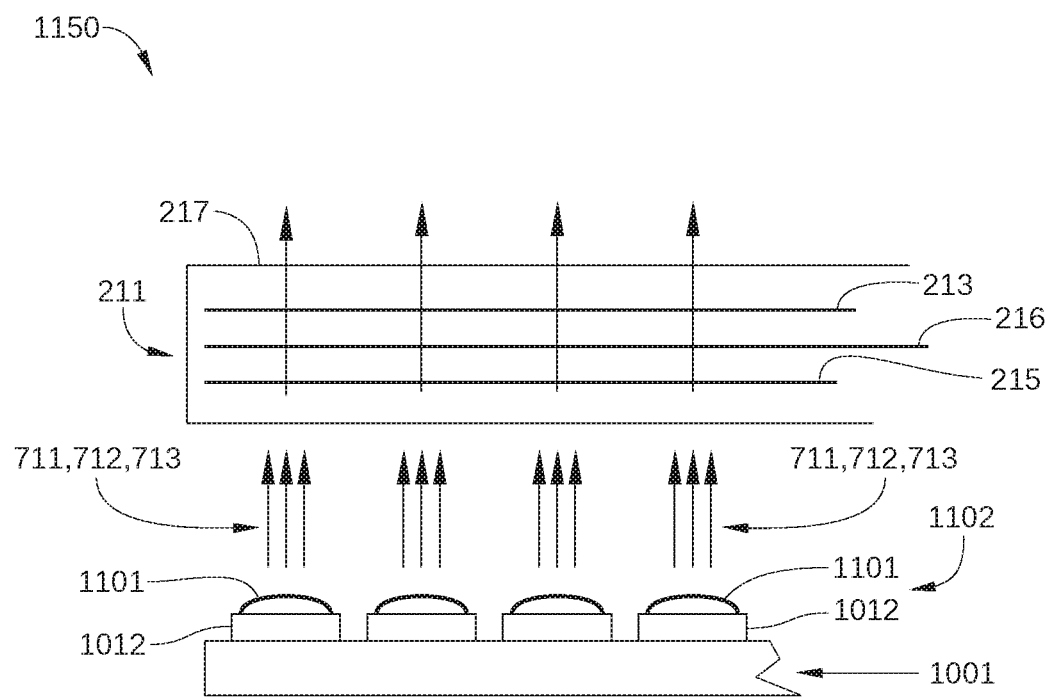
FIG. 11 is a partial schematic side view of a display device that includes a planar array of blue LEDs, according to the various other embodiments. For clarity, identical reference numbers have been used, where applicable, to designate identical elements that are common between figures. It is contemplated that features of one embodiment may be incorporated in other embodiments without further recitation.

In some embodiments, a planar array of blue LEDs generates green light 711, red light 712, and remainder portion 713 directly, as shown in FIG. 11. FIG. 11 is a partial schematic side view of a display device 1150 that includes a planar array 1102, according to the various embodiments. Display device 1150 is similar in configuration and operation to display device 1050 in FIG. 10, with the exception of the addition of a nanocrystal material 1101 that is disposed on an output surface of each of blue LEDs 1012. Nanocrystal material 1101 can be substantially similar to nanocrystal material 701 of FIG. 7, quantum dot layer 805 of FIG. 8A, quantum dot layer 825 of FIG. 8B, quantum dots and/or nanocrystal structures 835 of FIG. 8C, or any other suitable quantum dot or nanocrystal material. Consequently, when blue LEDs 1012 emit blue light, green light 711 and red light 712 are generated by nanocrystal material 1101, and remainder portion 713 is transmitted through nanocrystal material 1101.

In sum, various embodiments set forth systems and techniques for a wide color gamut LCD display device for a vehicle infotainment system with reduced heating of the display surface. The display device includes a blue-LED-based light source and a quantum-dot material configured to convert a portion of the light emitted by the blue-LED-based light source into a red light emission and a green light emission. In some embodiments, the quantum-dot material is formed on an output surface of the blue-LED-based light source, such as a light-emitting surface of a blue LED or an output lens or other outer surface of an array of blue LEDs. In some embodiments, a curved light guide plate enables the blue-LED-based light source to be disposed remotely from a touch-sensitive surface of the display device, and in some embodiments outside of a region defined a first plane defined by a front surface of the planar light guide that is optically coupled to the light-receiving surface of a liquid crystal module and a second plane defined by a rear surface of the planar light guide that opposes the front surface. Further, in some embodiments, the blue-LED-based light source is configured as a planar array of blue LEDs that is disposed more remotely from the touch-sensitive light source and distributes the blue LEDs across a larger area of the touch-sensitive light source than when an array of LEDs is disposed on an edge region of the display device.

Advantageously, in some embodiments, the quantum-dot material is disposed on an output surface of the blue-LED-based light source, thereby enabling improved efficiency of light conversion using less quantum-dot material. Furthermore, in some embodiments, the blue-LED-based light source is positioned away from the touch surface of the display device via a curved light guide, reducing the temperature of the touch surface during operation.

1. In some embodiments, a display device comprises a light source that includes a blue light-emitting diode (LED) configured to generate a blue output light; a nanocrystal material that is disposed between the light source and a liquid crystal module, the nanocrystal material configured to: receive the blue output light, convert a first portion of the blue output light to a green light emission, convert a second portion of the blue output light to a red light emission, and transmit a remainder portion of the blue output light; a liquid crystal module configured to receive the green light emission, the red light emission, and the remainder portion of the blue output light and generate an image that includes a portion of the green light emission, a portion of the red light emission, and a portion of the remainder portion of the blue output light; and a light guide assembly, comprising: a planar light guide optically coupled to a light-receiving surface of the liquid crystal module and configured to: receive incident light traveling in a first direction, and direct the incident light in a second direction toward the light-receiving surface of the liquid crystal module; and a curved light guide optically coupled to the planar light guide and configured to: receive light traveling in a third direction from the light source, and direct the light in the first direction toward the planar light guide.

2. The display device of clause 1, wherein the curved light guide is configured to direct the light in the first direction via total internal reflection.

3. The display device of clause 1 or 2, wherein the first direction is substantially parallel to the light-receiving surface of the liquid crystal module.

4. The display device of any of clauses 1-3, wherein the third direction is substantially perpendicular to the light-receiving surface of the liquid crystal module.

5. The display device of any of clauses 1-4, wherein the light source comprises a set of blue LEDs that are disposed outside of a region defined between (i) a first plane defined by a front surface of the planar light guide that is optically coupled to the light-receiving surface of the liquid crystal module, and (ii) a second plane defined by a rear surface of the planar light guide that opposes the front surface.

6. The display device of any of clauses 1-5, wherein the set of blue LEDs includes a linear array of blue LEDs.

7. The display device of any of clauses 1-6, wherein the set of blue LEDs includes a planar array of blue LEDs, the planar array being arranged parallel to the light-receiving surface of the liquid crystal module.

8. The display device of any of clauses 1-7, wherein the nanocrystal material is disposed on an output surface of the light source.

9. The display device of any of clauses 1-8, wherein the light source includes a linear array of blue LEDs, and the nanocrystal material is disposed on an outer surface of the linear array of blue LEDs.

10. The display device of any of clauses 1-9, wherein the output surface of the light source comprises a transparent encapsulant of the blue LED, and the nanocrystal material is disposed within the transparent encapsulant of the blue LED.

11. In some embodiments, a vehicle infotainment system comprises a processor configured to generate digital images; and a display device for displaying the digital images, the display device comprising: a light source that includes a blue light-emitting diode (LED) configured to generate a blue output light; a nanocrystal material that is disposed between the light source and a liquid crystal module, the nanocrystal material configured to: receive the blue output light, convert a first portion of the blue output light to a green light emission, convert a second portion of the blue output light to a red light emission, and transmit a remainder portion of the blue output light; a liquid crystal module configured to receive the green light emission, the red light emission, and the remainder portion of the blue output light and generate an image that includes a portion of the green light emission, a portion of the red light emission, and a portion of the remainder portion of the blue output light; and a light guide assembly comprising: a planar light guide optically coupled to a light-receiving surface of the liquid crystal module and configured to: receive incident light traveling in a first direction, and direct the incident light in a second direction toward the light-receiving surface of the liquid crystal module; and a curved light guide optically coupled to the planar light guide and configured to: receive light traveling in a third direction from the light source, and direct the light in the first direction toward the planar light guide.

12. The vehicle infotainment system of clause 11, wherein the light source comprises a set of blue LEDs that are disposed outside of a region defined between (i) a first plane defined by a front surface of the planar light guide that is optically coupled to the light-receiving surface of the liquid crystal module, and (ii) a second plane defined by a rear surface of the planar light guide that opposes the front surface.

13. The vehicle infotainment system of clauses 11 or 12, wherein the set of blue LEDs includes a linear array of blue LEDs.

14. The vehicle infotainment system of any of clauses 11-13, wherein the set of blue LEDs includes a planar array of blue LEDs, the planar array being arranged parallel to the light-receiving surface of the liquid crystal module.

15. The vehicle infotainment system of any of clauses 11-14, wherein each blue LED included in the planar array of blue LEDs is mounted on a first printed circuit board.

16. The vehicle infotainment system of any of clauses 11-15, wherein the nanocrystal material is disposed on an output surface of the light source.

17. The vehicle infotainment system of any of clauses 11-16, wherein the light source includes a linear array of blue LEDs, and the nanocrystal material is disposed on an outer surface of the linear array of blue LEDs.

18. The vehicle infotainment system of any of clauses 11-17, wherein the nanocrystal material is disposed on a light-emitting surface of the blue LED.

19. In some embodiments, a display device comprises a nanocrystal material that is disposed between a light source and a liquid crystal module, the nanocrystal material configured to: receive blue output light from the light source, convert a first portion of the blue output light to a green light emission, convert a second portion of the blue output light to a red light emission, and transmit a remainder portion of the blue output light; a liquid crystal module configured to receive the green light emission, the red light emission, and the remainder portion of the blue output light and generate an image that includes a portion of the green light emission, a portion of the red light emission, and a portion of the remainder portion of the blue output light; and a light guide assembly, comprising: a planar light guide optically coupled to a light-receiving surface of the liquid crystal module and configured to: receive incident light traveling in a first direction, and direct the incident light in a second direction toward the light-receiving surface of the liquid crystal module; and a curved light guide optically coupled to the planar light guide and configured to: receive light traveling in a third direction from the light source, and direct the light in the first direction toward the planar light guide.

20. The display device of clause 19, wherein the nanocrystal material includes at least one of quantum dots and quantum rods.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The block diagrams in the figures illustrate the architecture, functionality, and operation of possible implementations of systems according to various embodiments of the present disclosure.

While the preceding is directed to embodiments of the present disclosure, other and further embodiments of the disclosure may be devised without departing from the basic scope thereof, and the scope thereof is determined by the claims that follow.

The claimed invention is:

1. A display device, comprising:
    a light source that includes a blue light-emitting diode (LED) configured to generate a blue output light;
    a nanocrystal material that is disposed between the light source and a liquid crystal module, the nanocrystal material configured to:
        receive the blue output light,
        convert a first portion of the blue output light to a green light emission,
        convert a second portion of the blue output light to a red light emission, and
        transmit a remainder portion of the blue output light;
    a liquid crystal module configured to receive the green light emission, the red light emission, and the remainder portion of the blue output light and generate an image that includes a portion of the green light emission, a portion of the red light emission, and a portion of the remainder portion of the blue output light; and
    a light guide assembly, comprising:
        a planar light guide optically coupled to a light-receiving surface of the liquid crystal module and configured to:
            receive incident light traveling in a first direction, and
            direct the incident light in a second direction toward the light-receiving surface of the liquid crystal module,
            wherein the nanocrystal material is disposed outside of a region defined between (i) a first plane defined by a front surface of the planar light guide, and (ii) a second plane defined by a rear surface of the planar light guide opposite the front surface; and
        a curved light guide optically coupled to the planar light guide and configured to:
            receive light traveling in a third direction from the light source, and
            direct the light in the first direction toward the planar light guide,
                wherein the third direction is different than the first direction.

2. The display device of claim 1, wherein the curved light guide is configured to direct the light in the first direction via total internal reflection.

3. The display device of claim 1, wherein the first direction is substantially parallel to the light-receiving surface of the liquid crystal module.

4. The display device of claim 1, wherein the third direction is substantially perpendicular to the light-receiving surface of the liquid crystal module.

5. The display device of claim 1, wherein the light source comprises a set of blue LEDs that are disposed outside of the region.

6. The display device of claim 5, wherein the set of blue LEDs includes a linear array of blue LEDs.

7. The display device of claim 5, wherein the set of blue LEDs includes a planar array of blue LEDs, the planar array being arranged parallel to the light-receiving surface of the liquid crystal module.

8. The display device of claim 1, wherein the nanocrystal material is disposed on an output surface of the light source.

9. The display device of claim 8, wherein the light source includes a linear array of blue LEDs, and the nanocrystal material is disposed on an outer surface of the linear array of blue LEDs.

10. The display device of claim 8, wherein the output surface of the light source comprises a transparent encapsulant of the blue LED, and the nanocrystal material is disposed within the transparent encapsulant of the blue LED.

11. The display device of claim 1, wherein the light source is mounted on a first printed circuit board, and the display device comprises a back panel comprising the light guide assembly, an emission surface disposed on a front surface of the back panel, and a reflector panel disposed on a rear surface of the back panel, wherein the first printed circuit board is external to the back panel.

12. A vehicle infotainment system, comprising:
a processor configured to generate digital images; and
a display device for displaying the digital images, the display device comprising:
  a light source that includes a blue light-emitting diode (LED) configured to generate a blue output light;
  a nanocrystal material that is disposed between the light source and a liquid crystal module, the nanocrystal material configured to:
    receive the blue output light,
    convert a first portion of the blue output light to a green light emission,
    convert a second portion of the blue output light to a red light emission, and
    transmit a remainder portion of the blue output light;
  a liquid crystal module configured to receive the green light emission, the red light emission, and the remainder portion of the blue output light and generate an image that includes a portion of the green light emission, a portion of the red light emission, and a portion of the remainder portion of the blue output light; and
  a light guide assembly comprising:
    a planar light guide optically coupled to a light-receiving surface of the liquid crystal module and configured to:
      receive incident light traveling in a first direction, and
      direct the incident light in a second direction toward the light-receiving surface of the liquid crystal module,
      wherein the nanocrystal material is disposed outside of a region defined between (i) a first plane defined by a front surface of the planar light guide, and (ii) a second plane defined by a rear surface of the planar light guide opposite the front surface; and
    a curved light guide optically coupled to the planar light guide and configured to:
      receive light traveling in a third direction from the light source, and
      direct the light in the first direction toward the planar light guide,
      wherein the third direction is different than the first direction.

13. The vehicle infotainment system of claim 12, wherein the light source comprises a set of blue LEDs that are disposed outside of the region.

14. The vehicle infotainment system of claim 13, wherein the set of blue LEDs includes a linear array of blue LEDs.

15. The vehicle infotainment system of claim 13, wherein the set of blue LEDs includes a planar array of blue LEDs, the planar array being arranged parallel to the light-receiving surface of the liquid crystal module.

16. The vehicle infotainment system of claim 12, wherein the nanocrystal material is disposed on an output surface of the light source.

17. The vehicle infotainment system of claim 16, wherein the light source includes a linear array of blue LEDs, and the nanocrystal material is disposed on an outer surface of the linear array of blue LEDs.

18. The vehicle infotainment system of claim 16, wherein the nanocrystal material is disposed on a light-emitting surface of the blue LED.

19. A display device, comprising:
a nanocrystal material that is disposed between a light source and a liquid crystal module, the nanocrystal material configured to:
  receive blue output light from the light source, wherein the light source is mounted on a first printed circuit board,
  convert a first portion of the blue output light to a green light emission,
  convert a second portion of the blue output light to a red light emission, and
  transmit a remainder portion of the blue output light;
a liquid crystal module configured to receive the green light emission, the red light emission, and the remainder portion of the blue output light and generate an image that includes a portion of the green light emission, a portion of the red light emission, and a portion of the remainder portion of the blue output light; and
a light guide assembly, comprising:
  a planar light guide optically coupled to a light-receiving surface of the liquid crystal module and configured to:
    receive incident light traveling in a first direction, and
    direct the incident light in a second direction toward the light-receiving surface of the liquid crystal module,
    wherein the nanocrystal material is disposed outside of a region defined between (i) a first plane defined by a front surface of the planar light guide, and (ii) a second plane defined by a rear surface of the planar light guide opposite the front surface; and
  a curved light guide optically coupled to the planar light guide and configured to:
    receive light traveling in a third direction from the light source, and
    direct the light in the first direction toward the planar light guide,
    wherein the third direction is different than the first direction.

20. The display device of claim 19, wherein the nanocrystal material includes at least one of quantum dots or quantum rods.

* * * * *

UNITED STATES PATENT AND TRADEMARK OFFICE
CERTIFICATE OF CORRECTION

PATENT NO.         : 10,656,465 B2
APPLICATION NO.    : 15/836725
DATED              : May 19, 2020
INVENTOR(S)        : Rashmi Rao and Elijah Auger It is certified that error appears in the above-identified patent and that said Letters Patent is hereby corrected as shown below:

On the Title Page

Item (63) Related U.S. Application Data:
Please delete "Continuation-in-part of application No. 15/570,741, filed as application No. PCT/US2016/034867 on May 27, 2016." and insert --Continuation-in-part of application No. 15/570,741, filed on Oct. 30, 2017, which is a 371 of application No. PCT/US2016/034867, filed on May 27, 2016--;

In the Claims

Column 18, Claim 20, Line 64, please delete "nanoc-" and insert --nano- --;

Column 18, Claim 20, Line 65, please delete "rystal" and insert --crystal--.

Signed and Sealed this
Fourth Day of August, 2020

Andrei Iancu
*Director of the United States Patent and Trademark Office*